(12) United States Patent
Phan et al.

(10) Patent No.: US 10,244,884 B2
(45) Date of Patent: Apr. 2, 2019

(54) METHOD AND DEVICE FOR PRODUCING A BEVERAGE

(71) Applicant: Nestec S. A., Vevey (CH)

(72) Inventors: Minh Quan Phan, Bussigny (CH); Alfred Yoakim, St-Legier-la-Chiesaz (CH)

(73) Assignee: Sestec S.A., Vevey (CH)

( * ) Notice: Subject to any disclaimer, the term of this patent is extended or adjusted under 35 U.S.C. 154(b) by 321 days.

(21) Appl. No.: 15/110,568

(22) PCT Filed: Dec. 19, 2014

(86) PCT No.: PCT/EP2014/078628
§ 371 (c)(1),
(2) Date: Jul. 8, 2016

(87) PCT Pub. No.: WO2015/104165
PCT Pub. Date: Jul. 16, 2015

(65) Prior Publication Data
US 2016/0374502 A1    Dec. 29, 2016

(30) Foreign Application Priority Data
Jan. 10, 2014 (EP) .................................... 14150698

(51) Int. Cl.
*A47J 31/00* (2006.01)
*A47J 31/40* (2006.01)
(Continued)

(52) U.S. Cl.
CPC ............... *A47J 31/002* (2013.01); *A23F 5/26* (2013.01); *A23F 5/262* (2013.01); *A47J 31/34* (2013.01); *A47J 31/407* (2013.01)

(58) Field of Classification Search
CPC ........ A47J 31/002; A47J 31/34; A47J 31/407; A23F 5/26; A23F 5/262
See application file for complete search history.

(56) References Cited

U.S. PATENT DOCUMENTS

2011/0003038 A1* 1/2011 Colantonio ........... A47J 31/002
                                                    426/80
2011/0189362 A1* 8/2011 Denisart ................ A47J 31/22
                                                    426/433
(Continued)

FOREIGN PATENT DOCUMENTS

CN         1761425 A     4/2006
CN       101415356 A     4/2009
(Continued)

OTHER PUBLICATIONS

International Search Report, dated Apr. 22, 2015, in PCT/EP2014/078628, filed Dec. 19, 2014.
(Continued)

*Primary Examiner* — Anthony J Weier
(74) *Attorney, Agent, or Firm* — Dunlap Codding P.C.

(57) ABSTRACT

A method and device for producing a beverage from a capsule containing at least one beverage ingredient are disclosed. The device is configured to carry out the method by feeding a first volume of water into the capsule for prewetting the at least one beverage ingredient, interrupting the flow of water into the capsule for a predetermined waiting time, feeding a second volume of water into the capsule for extracting the at least one beverage ingredient, and dispensing the produced beverage.

16 Claims, 5 Drawing Sheets

(51) Int. Cl.
*A23F 5/26* (2006.01)
*A47J 31/34* (2006.01)

(56) References Cited

U.S. PATENT DOCUMENTS

2012/0171332 A1* 7/2012 Lai .................... A47J 31/42
                                                          426/78
2012/0308691 A1* 12/2012 Alvarez .............. A47J 31/0642
                                                          426/113

FOREIGN PATENT DOCUMENTS

| CN | 102264266 A | 11/2011 |
| CN | 102448353 A | 5/2012 |
| EP | 1839541 A1 | 10/2007 |
| EP | 1922963 A1 | 5/2008 |
| EP | 2001343 B1 | 4/2011 |
| WO | 2008058731 A2 | 5/2008 |
| WO | 2010076263 A1 | 7/2010 |

OTHER PUBLICATIONS

Written Opinion of the International Searching Authority, dated Apr. 22, 2015, in PCT/EP2014/078628, filed Dec. 19, 2014.
CN201480072451.4; Nestec S. A.; Office Action and English Translation dated Jun. 28, 2018; 13 pages.

* cited by examiner

METHOD AND DEVICE FOR PRODUCING A BEVERAGE

CROSS REFERENCE TO RELATED APPLICATIONS/INCORPORATION BY REFERENCE STATEMENT

This application is a US national stage application filed under 35 USC § 371 of International Application No. PCT/EP2014/078628, filed Dec. 19, 2014; which claims priority to Application No. EP 14150698.0, filed Jan. 10, 2014. The entire contents of the above-referenced application are hereby expressly incorporated herein by reference.

BACKGROUND

The presently disclosed and/or claimed inventive concept(s) relates to a method and a device for producing a beverage from a capsule, for example by extracting at least one beverage ingredient contained in the capsule. The method and device of the presently disclosed and/or claimed inventive concept(s) apply a step of prewetting of the at least one beverage ingredient in the capsule, before the beverage ingredient is extracted and the beverage is dispensed.

Prewetting is generally known from the state of the art. For example, the state of the art proposes supplying a capsule containing a beverage ingredient with a predefined quantity of water, so that the beverage ingredient is soaked with the water. After pausing for a few seconds (by interrupting the water supply into the capsule) for prewetting, the water supply into the capsule is resumed, in order to extract a beverage from the beverage ingredient and to dispense the beverage from the capsule. Prewetting has the advantage that the extraction quality of the beverage ingredient, which may for example be roast or ground coffee, is improved. In particular, aromatic compounds of the beverage ingredient are better captured by the water before being dispensed as the beverage.

EP 0 250 810 A1 discloses a capsule, which is provided with a delivery membrane having a line of weakening that breaks, when the pressure in the capsule reaches a certain threshold value. In a prewetting phase, water is introduced into the capsule at a certain pressure value, in order to make coffee contained inside the capsule swell but to keep the delivery membrane unharmed. The water slowly distributes in the coffee bed, and the water supply is shortly stopped as long as the delivery membrane is still closed. The prewetting phase is maintained for a couple of seconds, until the coffee in the capsule is uniformly wetted and the aromatic compounds of the coffee are well captured by the water. Thereafter, air is injected into the capsule, in order to tear the delivery membrane along its line of weakness, and to dispense the extracted beverage from the capsule.

EP 2 001 343 B1 discloses a capsule, which is provided with water for prewetting at a pressure of at least 3 bar during a period of 1 s to 60 s. Thereafter, an outlet of the capsule is opened, and the extracted beverage is dispensed. The pressure required for the prewetting phase is detected by a pressure detector.

A problem with detecting the pressure as described above is that a measurement signal output from the pressure detector is not precise enough. In particular, when the pressure condition to be reached is detected by the pressure detector, the delivery membrane of the capsule is generally already perforated. Additionally, when there is too much water in the capsule, the coffee bed may be compacted and as a consequence the pressure in the capsule may increase too much, and make the further coffee extraction difficult. In the worst case, the pump supplying the water into the capsule blocks.

The state of the art further describes a method, in which the pressure is maintained by feeding a preset volume of water into an extraction chamber or a capsule by operating a water pump for a preset period of time. However, also for this method the pressure detection is not precise enough. This is particularly due to the fact that the volume of water depends on the volume of coffee contained in the capsule.

In view of the state of the art and the above mentioned problems, there is need for a method and device, which allow determining more precisely and more clearly the time point, at which the capsule is correctly filled with water for prewetting.

DETAILED DESCRIPTION

Figure 1:
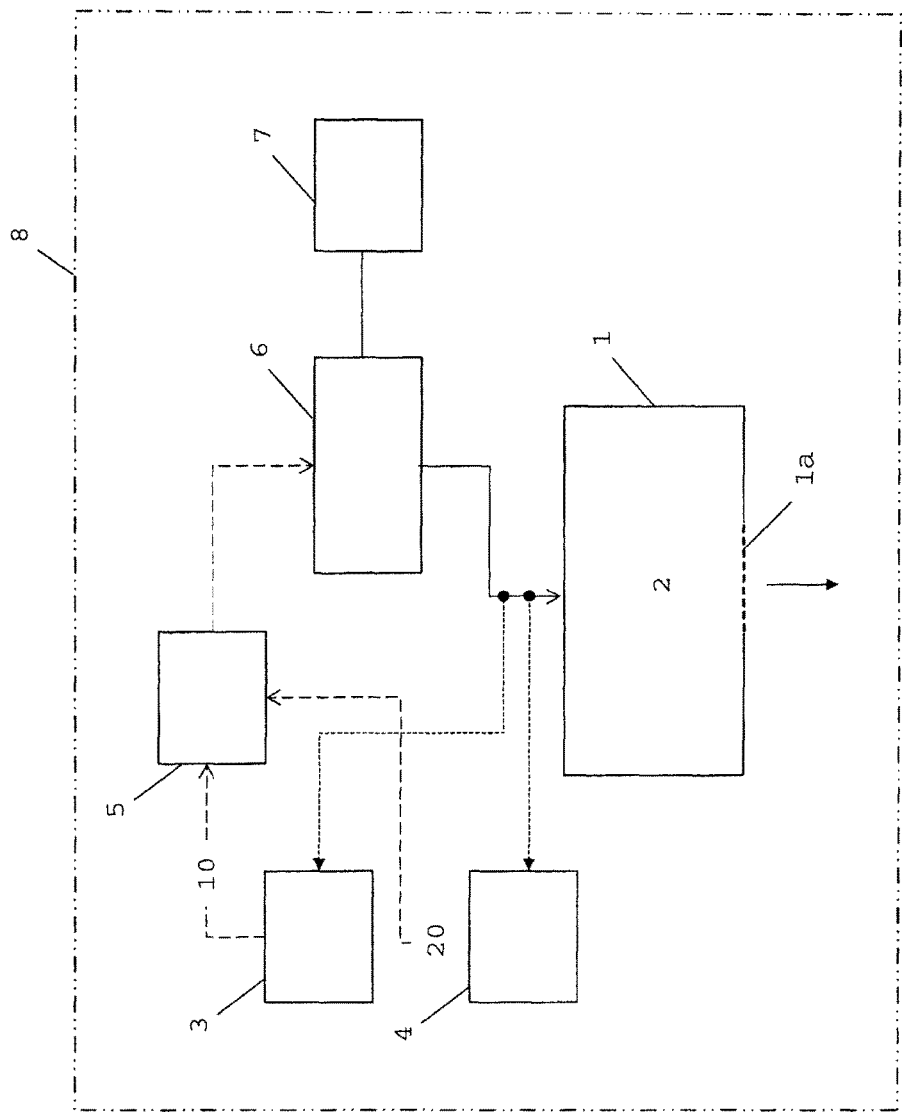
FIG. 1 is a schematic diagram of a device according to the presently disclosed and/or claimed inventive concept(s).

Therefore, the presently disclosed and/or claimed inventive concept(s) intends to provide an improved method and device for producing a beverage from a capsule. In particular, the presently disclosed and/or claimed inventive concept(s) has the object to improve a prewetting step, in particular by measuring more precisely a time point for interrupting a volume of water fed into the capsule for prewetting. The presently disclosed and/or claimed inventive concept(s) thereby aims for a simple and efficient measurement technique.

The object of the presently disclosed and/or claimed inventive concept(s) is solved by the subject-matter of the independent claims. The core idea of the presently disclosed and/or claimed inventive concept(s) is to use a flow meter for measuring a flow of water into the capsule, and to obtain a plurality of parameters by analyzing the flow meter signal. The parameters are indicative of the optimal time point of interrupting the flow of water into the capsule to obtain the ideal volume of water for prewetting, and are generally obtained by mathematical operations applied to the flow meter signal. Further advantageous implementations of the solution of the presently disclosed and/or claimed inventive concept(s) are presented in the dependent claims.

In particular, the presently disclosed and/or claimed inventive concept(s) is directed to a method for producing a beverage from a capsule containing at least one beverage ingredient, the method comprising feeding a first volume of water into the capsule for prewetting the at least one beverage ingredient, interrupting the flow of water into the capsule for a predetermined waiting time, feeding a second volume of water into the capsule for extracting the at least one beverage ingredient, and dispensing the produced beverage, wherein the time point of interrupting the flow of water into the capsule is determined by evaluating a measurement signal output by a flow meter.

The method based on the evaluation of the flow meter measurement signal allows for a precise determination of the time point of interrupting the flow of water into the capsule. In particular, the method can be applied to measure precisely said time point for different capsule types. The ideal first volume of water, which is the water volume used for prewetting, can thus be fed into the capsule. Thus, the prewetting phase can be carried out properly, for example, without already breaking an opening face of the capsule and dispensing the beverage. In particular, the prewetting time can be set more precisely. As a result the production of the beverage can be improved from a technical point of view. For example, the flow time and the yield may be increased. Furthermore, the precise prewetting time also improves the taste of the produced beverage, since aromatic compounds in the at least one beverage ingredient can be well captured by the water, and can be transferred to the produced beverage most efficiently. In particular, the beverage can thus be produced with more complex tastes, with more body and with stronger aromatics. The presently disclosed and/or claimed inventive concept(s) applies particularly well for coffee beverages produced from coffee ingredients, like roast or ground coffee, contained in the capsule.

Advantageously, an outlet face of the capsule is opened by feeding the second volume of water into the capsule.

By opening the outlet face of the capsule with the second volume of water, dedicated opening means in a beverage production machine may be omitted. Furthermore, the pressure can be kept high during the whole dispensing time of the beverage, which increases the taste of the produced beverage.

However, it is also possible—and for certain beverages to be produced also beneficial for determining the optimal filling with water for prewetting—that the flow of water is interrupted after the capsule has been opened. In this case, in certain non-limiting embodiments, a delay time is added to the time point determined by evaluating the measurement signal of the flow meter. The delay time is, in certain non-limiting embodiments, a few hundreds of milliseconds, such as (but not limited to) 300 to 500 ms.

Advantageously, the second volume of water is fed into the capsule at a pressure of between 3 and 20 bar, such as (but not limited to) 5 and 17 bar.

With these desired (but non-limiting) pressure values, the optimum yield and the best taste of the produced beverage are achieved.

Advantageously, the time point of interrupting the flow of water into the capsule is determined based on a flow rate evaluated from the measurement signal of the flow meter.

The flow rate is, in certain non-limiting embodiments, the absolute instantaneous value of the flow rate derived directly from the measurement signal of the flow meter. The flow rate can be simply calculated by the volume of water flowing into the capsule within a predetermined amount of time. Flow meters typically deliver a signal, which changes polarity for each fixed volume of water passing through the flow meter. The time between the polarity changes is, in certain non-limiting embodiments, measured to determine a precise flow rate in a simple manner.

Advantageously, the flow rate evaluated from the measurement signal of the flow meter is compared with a first threshold value, and the flow of water into the capsule is interrupted after the evaluated flow rate reaches the first threshold value.

When the flow rate reaches or drops below the first threshold value, which may for example be 5.5 ml/s, the measurement signal output by the flow meter reflects well the slowing down of the flow rate, as the capsule fills with water. Thus, the flow rate is indicative of the time point, at which the capsule is properly filled with a suited first volume of water for the prewetting phase. The flow rate threshold is used as a necessary condition before the flow of water is interrupted. Using the flow rate as the only necessary condition is in principle possible, but not the preferred solution, because it compromises on the preciseness of the measurement. In certain non-limiting embodiments, the flow rate is thus used as a precondition that must be fulfilled when a further condition is met. Details of such a further condition are described below.

The time point of interrupting the flow of water into the capsule is essentially determined based at least on a gradient of a flow rate gradient evaluated from the measurement signal of the flow meter. Advantageously, the time point of interrupting the flow of water into the capsule is determined based on the evaluated flow rate and a gradient of a flow rate evaluated from the measurement signal of the flow meter.

Taking additionally into account the gradient of the flow rate gradient according to the above combination of parameters improves the accuracy of the determination of the time point of interrupting the flow of water into the capsule, and thus the accuracy of the optimal first volume of water.

Advantageously, the gradient of the flow rate gradient is compared with a second threshold value, such as (but not limited to) a negative value, and the flow of water into the capsule is interrupted, when the flow rate reaches the first threshold value and the gradient of the flow rate gradient reaches the second threshold value.

The flow rate threshold is thus placed as precondition that must be fulfilled when the gradient of the flow rate gradient threshold is reached. The determination of the above conditions, i.e. the precondition that the flow reaches and/or drops below the first threshold value and the main condition that the gradient of the flow rate gradient reaches or drops below the negative threshold value, provides a particularly precise indication for the time point, at which the capsule is filled with the right amount of water for prewetting.

Advantageously, the gradient of the flow rate gradient is analyzed for a local maximum and is compared with a third threshold value, such as (but not limited to) a positive value, and the flow of water into the capsule is interrupted, when the flow rate reaches the first threshold value and the gradient of the flow rate gradient is at a local maximum and has reached the third threshold value.

When the local maximum of the gradient of the flow gradient is detected, and when at the same instant the gradient of the flow rate gradient reaches, or is higher than, a third threshold value, the optimal amount of water for prewetting fills the capsule. Thus, the time point for interrupting the water flow, in order to start the prewetting time, can be precisely determined.

Advantageously, the second threshold value and the third threshold value, respectively, are selected such that the first volume of water fills about 85% to 90% of the total volume of the capsule at the time point of interrupting the flow of water into the capsule.

In certain non-limiting embodiments, a certain margin is selected for the second and third threshold value, respectively, in order to ensure the proper filling of the capsule with water. Thereby, the prewetting of the beverage ingredient can be improved.

Advantageously, the flow rate is evaluated from the measurement signal of the flow rate meter after a predetermined delay time from the start of the feeding of the first volume of water.

Shortly after the start of feeding of water into the capsule, for example by activating a pump, the evaluated flow rate values may not be representative (e.g. because the flow meter is moving too fast). As a consequence the flow rate gradient and the gradient of the flow rate gradient may exhibit huge variations, especially if a solenoid pump is used. Therefore, the predetermined delay time is useful to discard potentially imprecise values of the flow rate. Consequently, the determination of the time point for interrupting the flow of water into the capsule may be carried out more precisely.

Advantageously, the predetermined waiting time is selectable by a user and/or is between about 1 and 3 s.

In certain non-limiting embodiments, the prewetting time can be flexibly set by a user of a machine performing the method of the presently disclosed and/or claimed inventive concept(s). Alternatively, the prewetting time may be chosen automatically. 1 s determines a short prewetting phase, and 3 s determines a long prewetting phase. The user may continuously choose in between the short and the long prewetting phase according to a desired taste of the produced beverage. Alternatively, a machine performing the method of the presently disclosed and/or claimed inventive concept(s) may determine the best prewetting time based on a determination of the capsule type.

Advantageously, the measurement signal of the flow meter is evaluated by a moving window averaging method calculated on a predetermined number of samples and with a predetermined filter time.

For example, the number of samples may be N=4, and the filter time may be t1=10 ms for each control loop of the process. Thus, a total filter time constant may be 4*t1=40 ms. The width of the moving window ΔTW may, for example, be set as four times the total filter time constant, i.e. ΔTW=160 ms.

Advantageously, the time point of interrupting the flow of water into the capsule determined by evaluating the measurement signal of the flow meter is verified based on a measurement signal of a pressure sensor.

By additionally using the pressure sensor, the preciseness of the determination derived from the flow meter signal can be verified. In certain non-limiting embodiments, the pressure sensor is only used for experimental control, in order to determine the correctness of all signals and the calculation model. The verification, for example, allows a conclusion as to whether the flow meter functions correctly or is in need to be replaced or repaired. It is also possible that the measurement signal of the flow meter and the measurement signal of the pressure sensor are evaluated together. For example, the respective results may be added and/or averaged.

The presently disclosed and/or claimed inventive concept(s) is further directed to a device for producing a beverage from a capsule containing at least one beverage ingredient, wherein the device is configured to carry out the method according to the above described implementations.

In certain non-limiting embodiments, the device has means, which are configured to carry out the individual method steps of the presently disclosed and/or claimed inventive concept(s) described above. In particular, such means can include a pump, a water reservoir, a flow meter, a pressure sensor, a control unit, a capsule holder, dispensing means, opening means or the like.

In particular, the presently disclosed and/or claimed inventive concept(s) is directed to a device for producing a beverage from a capsule containing at least one beverage ingredient, the device comprising a pump for feeding water from a water reservoir into the capsule, a flow meter for measuring the flow of water into the capsule and for outputting a measurement signal to a control unit, the control unit being configured to control the pump to feed a first volume of water into the capsule for prewetting the at least one beverage ingredient, interrupt the flow of water into the capsule for a predetermined waiting time, and control the pump to feed a second volume of water into the capsule for extracting the at least one beverage ingredient. The device further comprises optionally opening means for opening an outlet face of the capsule, and comprises dispensing means for dispensing the produced beverage from the capsule, wherein the control unit is configured to determine the time point of interrupting the flow of water into the capsule by evaluating a measurement signal of the flow meter.

With the device of the presently disclosed and/or claimed inventive concept(s), the same advantages as described above for the method of the presently disclosed and/or claimed inventive concept(s) are achieved. The device of the presently disclosed and/or claimed inventive concept(s) may be further configured to carry out all method steps described above. Therefore, additional means may be added to the device, or the control unit may be provided with additional configurations and functions.

The presently disclosed and/or claimed inventive concept(s) is described in the following in more detail with reference to the attached drawings.

FIG. 1 shows a block diagram of a device 8 according to an embodiment of the presently disclosed and/or claimed inventive concept(s) for producing a beverage from a capsule 1. The capsule 1 contains at least one beverage ingredient 2 and may be a sealed capsule 1. The capsule 1 may be a rigid or semi-rigid capsule, a pod, a pouch, a cartridge or an extraction chamber of a beverage production machine. The at least one beverage ingredient 2 may be coffee, ground coffee, coffee powder, tea powder, tea leaves, milk powder, taste imparting ingredients, a mixture thereof or similar ingredients suitable for extracting, brewing and/or dissolving to produce a beverage.

For producing a beverage from the capsule 1, a liquid, such as (but not limited to) water, needs to be fed into the capsule 1. Therefore, in certain non-limiting embodiments, the device 8 is provided with a pump 6 for pumping water from a water reservoir 7, like a container or tank, into the capsule 1. Alternatively, the liquid may also comprise or be milk, tea, chocolate, syrup or the like. In certain non-limiting embodiments, the pump 6 is a solenoid piston pump, but can be any kind of pressure pump. Before entering the capsule 1, the water can further be pumped through a heating device, for example a boiler or an in-line heater, in order to prepare a hot beverage from the capsule 1.

The device 8 is further equipped with a flow meter 3, is installed and configured to measure the flow of water fed, for example by the pump 6, into the capsule 1. A corresponding measurement signal 10 is output by the flow meter 3. In certain non-limiting embodiments, the measurement signal 10 is output to a control unit 5 of the device 8, which is (in certain non-limiting embodiments) enabled to operate the pump 6. Typically, the measurement signal 10 of the flow meter 3 is a signal, which changes its polarity for each fixed volume of water passing through the flow meter 3 and entering the capsule 1.

Optionally, the device 8 further includes a pressure sensor 4 installed and configured to measure the pressure of the water fed into the capsule 1 and/or the water pressure inside of the capsule 1. The pressure sensor 4 outputs a measurement signal 20 to the control unit 5.

The control unit 5 is configured to operate the pump 6 based on an analysis or evaluation of the measurement signal 10, and in certain non-limiting embodiments, the measurement signal 20. In particular, the control unit 5 is configured to evaluate the measurement signal 10 for indicative parameters, in order to determine precisely an ideal time point for interrupting the flow of water into the capsule 1, i.e. for interrupting the flow of water after a first volume of water has been fed into the capsule 1, which is optimal for prewetting the at least one beverage ingredient 2 in the capsule 1. When the control unit 5 determines based on its analysis of the measurement signal 10 that the optimal time point of interrupting the flow of water is reached for having the ideal first volume of water for prewetting, the control unit 5 is configured to interrupt the flow of water into the capsule 1 for a predetermined waiting time. Therefore, the control unit 5 may stop or pause the pump 6, or may close a valve downstream of the pump 6.

In certain non-limiting embodiments, the predetermined waiting time is between 1 s and 3 s. The predetermined waiting time corresponds to the prewetting time of the at least one beverage ingredient 2 in the capsule 1. After the predetermined waiting time, the control unit 5 is configured to control the pump 6 to resume the water flow, and to start feeding a second volume of water into the capsule 1. In certain non-limiting embodiments, the second volume of water is chosen based on the capsule type, i.e. the kind of beverage to be produced. The second volume of water extracts or dissolves the at least one beverage ingredient 2, completely in certain non-limiting embodiments, and may further cause an outlet face 1a of the capsule 1 to open due to the rising water pressure within the capsule. For example, the outlet face 1a of the capsule 1 may deform and break at a predetermined breaking line. Alternatively, the outlet face 1a can be pushed by the water pressure against rupturing or perforation means for tearing the face 1a. The rupturing or perforation means may be included inside the capsule 1 or may be installed in a beverage production machine. The rupturing or perforation means are operated by the rise of pressure, which is caused by the feeding of the second volume of water into the capsule 1. Alternatively, the beverage device 8 may also include other opening means for opening the outlet face 1a of the capsule 1 independent from the water pressure. For example, perforation means may be moved against the outlet face 1a. The opening means may also be a valve in the capsule such as a slit or a ketchup valve. When the outlet face 1a of the capsule 1 is opened, the beverage produced inside the capsule 1, for example by extraction, is dispensed, such as (but not limited to) through dispensing means of the beverage device 8.

Figure 2:
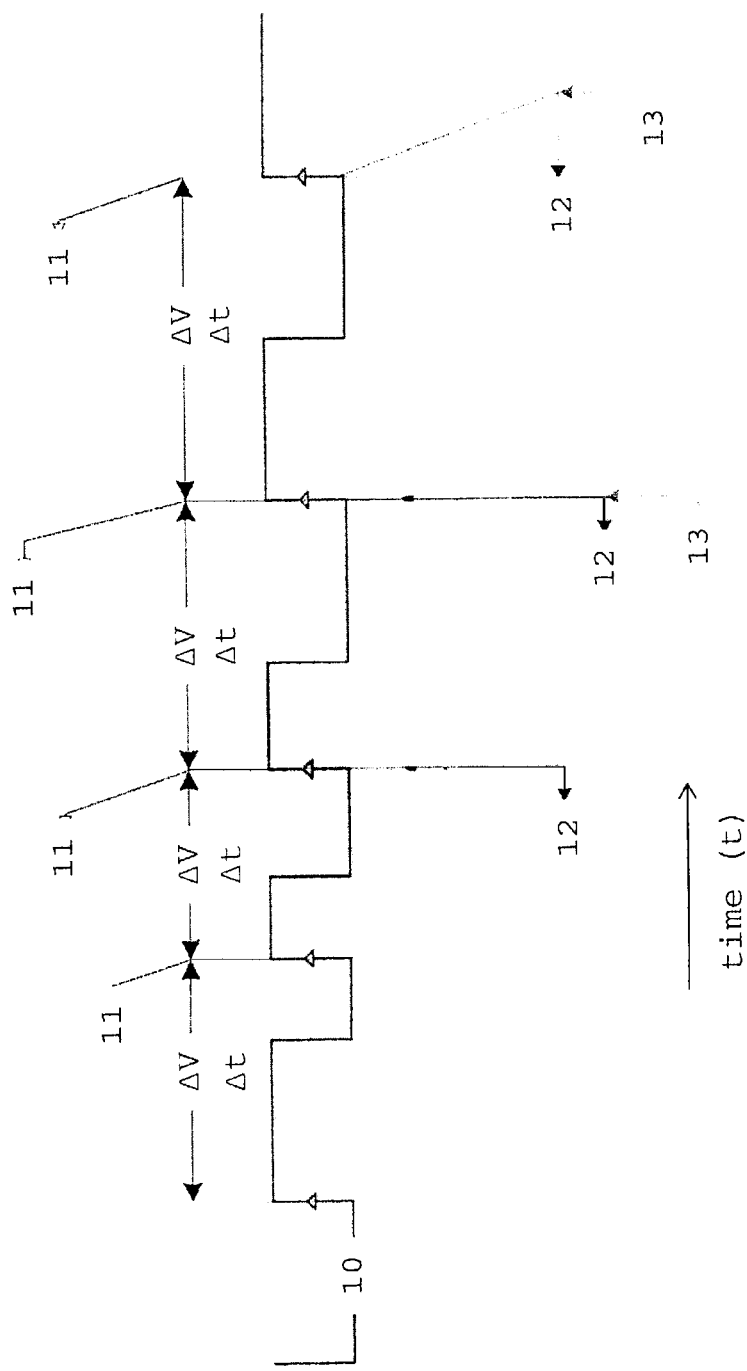
FIG. 2 illustrates how a measurement signal of a flow meter is evaluated according to a method of the presently disclosed and/or claimed inventive concept(s).

FIG. 2 shows a typical measurement signal 10 as output from the flow meter 3. Each time a certain volume $\Delta V$ passes through the flow meter 3, the signal 10 produces a rising edge, and e.g. changes its polarity. At each rising edge the flow rate 11 (abbreviated as F) may be determined in units of, for example, ml/s. In particular, the flow rate 11 can be simply calculated from the volume difference $\Delta V$ and the time difference $\Delta t$ between two rising edges, namely by $$F=\Delta V/\Delta T [\text{ml/s}].$$

In certain non-limiting embodiments, the flow rate 11 is determined only after a certain delay from the start of the measurement signal 10, for example after a fixed delay of e.g. 1.5 s or a delay of one or more rising edges.

Furthermore, at each rising edge a flow rate gradient 12 may be determined. The flow rate gradient 12 is the change of the flow rate 11, i.e. how fast the flow rate 11 changes in a predetermined period of time $\Delta t$. In certain non-limiting embodiments, the flow rate gradient 12 is determined in units of ml/s$^2$. The flow rate gradient 12 (abbreviated as FG) is in particular calculated as the derivative of the flow rate 11 by $$FG=\Delta F/\Delta T=\Delta V/\Delta T^2 [\text{ml/s}^2].$$

In particular, for an observation window of $\Delta TW$ $$FG=\Delta F/\Delta T^2=(F(t)-F(t-\Delta TW))/\Delta TW.$$

Further, the speed of the variation of the flow rate 11 (i.e. how the fast flow rate 11 is changing) can be derived as the so-called gradient 13 of the flow rate gradient 12. Typically, said gradient 13 of the flow rate gradient 12 is obtained in units of ml/s$^3$. The gradient 13 of the flow rate gradient 12 is also measured at the rising edge. The gradient 13 of the flow rate gradient 12 (abbreviated by GFG) is computed in a similar way as the flow rate gradient 12 itself, namely by $$GFG=\Delta FG/\Delta T^2=(FG(t)-FG(t-\Delta TW))/\Delta TW.$$

Some other mathematical analysis may be performed to evaluate the measurement signal 10 of the flow meter 3. For example, local maxima of the flow rate gradient 12 or of the gradient 13 of the flow rate gradient 12 can be determined.

The determination of the relevant parameters described above can be updated at each control loop of the process, for example, each t1=10 ms. In certain non-limiting embodiments, the measurement of the flow is filtered with a method called "moving window averaging" calculated on a plurality of samples N, for example N=4. Thus, the filter time constant is N*t1, for example, 4*10 ms=40 ms. In certain non-limiting embodiments, the moving window $\Delta TW$ is selected as M*t1, for example for M=4 as $\Delta TW$=4*40 ms=160 ms. However, if implemented by a microcontroller, the method using a division into constant $\Delta TW$ may be replaced by other operations, like additions and subtractions, in order to reduce the power consumption.

Figure 3:
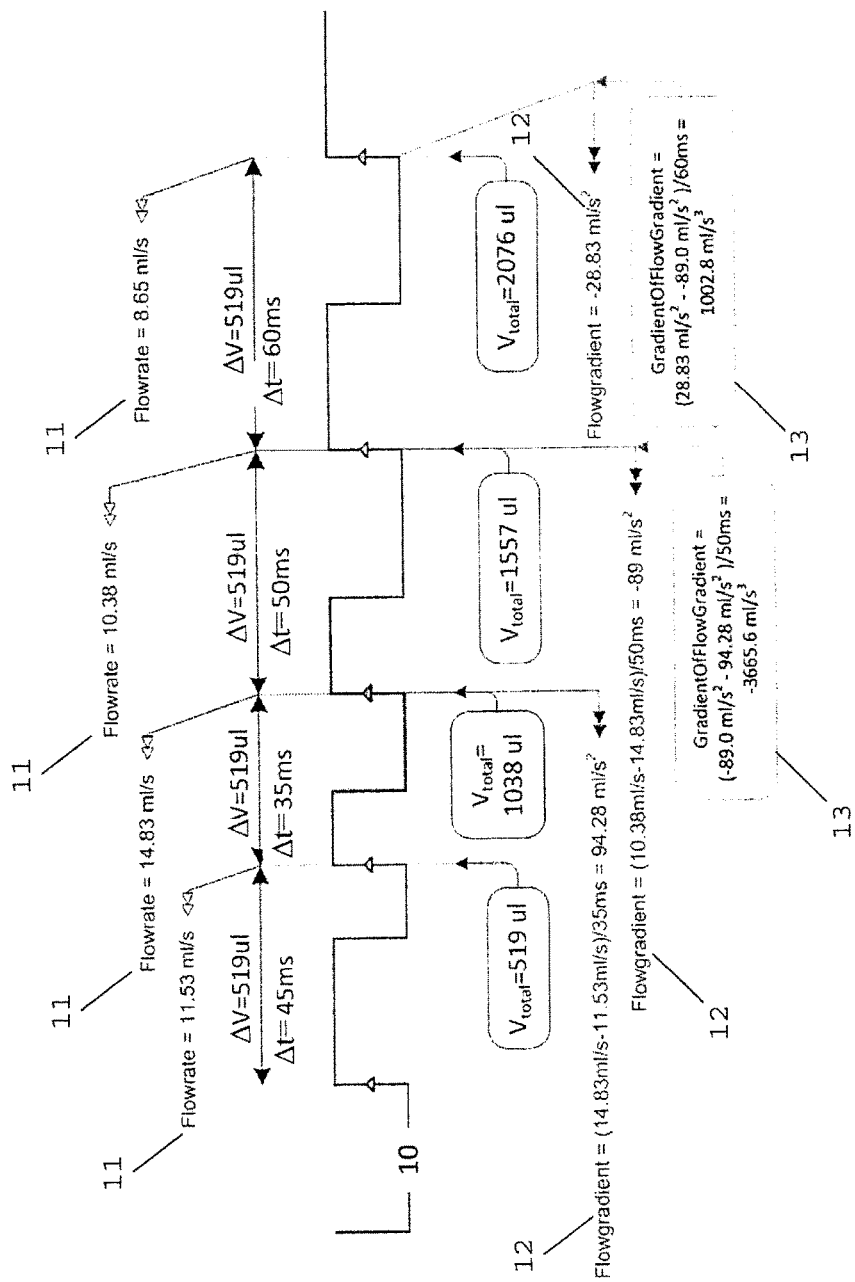
FIG. 3 shows a specific example of how a measurement signal of a flow meter is evaluated according to the method of the presently disclosed and/or claimed inventive concept(s).

FIG. 3 shows a specific example of evaluating the measurement signal 10 of the flow meter 3. In the example for each volume of 519 µl of water passed through the flow meter 3, the measurement signal 10 produces a rising edge. The time $\Delta t$ between the rising edges can be evaluated, for example, by the control unit 5 of the device 8. By evaluating the time difference $\Delta t$ from one rising edge to the other, the flow rate 11 can be calculated as described above. For example as shown in FIG. 3, when the time difference $\Delta t$ is 45 ms, the flow rate 11 is 11.53 ml/s. If the time difference $\Delta t$ is 35 ms, the flow rate 11 is 14.83 ml/s.

From the flow rates 11 evaluated at two consecutive rising edges of the measurement signal 10, the flow rate gradient 12 can be calculated as described above. For example as shown in FIG. 3, for a change of the flow rate 11 from 11.53 ml/s to 14.83 ml/s within $\Delta t$=35 ms, the flow rate gradient 12 is 94.28 ml/s$^2$.

Likewise, the gradient 13 of the flow rate gradient 12 can be derived at two consecutive rising edges, namely by the change of the flow rate gradient 12. For example as shown in FIG. 3, if the flow rate gradient 12 changes from 94.28 ml/s² to −89 ml/s² within Δt=50 ms, the gradient 13 of the flow rate gradient 12 is −3665.6 ml/s³.

Based on the above-mentioned determined values from the measurement signal 10, the following conditions a), b) and/or c) may then be determined, for example by the control unit 5.

a) As first condition may be determined, whether the absolute flow rate 11 value evaluated from the measurement signal 10 reaches (i.e. drops to or below) a first threshold value 14, which may for example be 5.5 ml/s. The first threshold value 14 reflects the slowing down of the flow rate 11, as the capsule 1 fills with water. This first condition is, in certain non-limiting embodiments, a precondition, which must be fulfilled for determining the best instant to stop the feeding of the first volume of water into the capsule 1 such as (but not limited to) based on further conditions.

b) As second condition may be determined, whether the gradient 13 of the flow rate gradient 12 reaches (i.e. drops to or below) a negative second threshold value 15, for example a value of −3000 ml/s³. If the gradient 13 of the flow rate gradient 12 reaches this second threshold value 15, i.e. if the second condition is fulfilled, and additionally the flow rate 11 has reached the first threshold value 14, i.e. the first (pre)condition is fulfilled, the best instant to stop the feeding of the first volume of water into the capsule 1 may be determined.

c) As a third condition may be determined, whether the gradient 13 of the flow rate gradient 12 exhibits a local maximum 17, and whether at the same instant the gradient 13 of the flow rate gradient 12 has reached (i.e. is at or above) a third threshold value 16, which is for example set as +3000 ml/s³. If the third condition is fulfilled, and if additionally the flow rate 11 has reached the first threshold value 14, i.e. if also the first (pre) condition is fulfilled, the best instant to stop the feeding of the first volume of water into the capsule 1 may be determined.

The conditions b) and c) of the gradient 13 of the flow rate gradient 12 (i.e. the second derivative of the flow rate 11) are not arbitrarily monitored conditions, but are monitored because the following two typical phenomena have been noticed after many experiments.

Initially—when feeding a first volume of water into a capsule 1—it has been noticed that the flow rate 11 is more or less flat or diminishes slowly.

As first phenomenon has further been noticed that at some point the flow rate 11 decreases abruptly, while at the same time the pressure in the capsule 1 increases abruptly. Apparently, at first the at least one beverage ingredient 2 in the capsule 1 absorbs the introduced water regularly, but then comes abruptly to a saturation causing the pressure to increase. The saturation occurs just before the necessary pressure for opening the capsule 1, for instance by breaking an opening face 1a of the capsule 1, is reached. The first phenomenon is detected by monitoring the second condition b).

As second phenomenon has further been noticed that shortly before the above-mentioned saturation occurs, the flow rate 11 suddenly rises again, before it decreases abruptly. Apparently, at this instant the at least one beverage ingredient absorbs water under pressure causing the flow rate 11 to increase. The second phenomenon is detected by monitoring the third condition c).

In case of some capsules 1, the monitoring of the third condition c) fails to detect the second phenomenon, for example, because the local maximum occurs below the third threshold value 16. However, even in such case the first phenomenon is detected by monitoring the second condition b), particularly the first phenomenon occurs about 200-300 ms after the missed second phenomenon.

The flow rate gradient 12 (i.e. the first derivative of the flow rate 11) is not used for triggering the interruption of the water flow, because its variability is too high, and thus too many false conditions occur before a desired true condition is met.

In general, as best instant for interrupting the flow of water into the capsule 1 is, in certain non-limiting embodiments, determined the time point when the conditions a) and b) are met (only if condition b) is satisfied after condition a)), or when the conditions a) and c) are met (only if condition c) is satisfied after condition a). In other words, the water flow is, in certain non-limiting embodiments, interrupted when the first one of the two conditions b) and c) is met. Monitoring both conditions b) and c) makes the determination of the time point more precise and more robust (for example, the missed second phenomenon may be compensated by still detecting the first phenomenon). Monitoring also the condition a) as a precondition avoids the detection of accidental variations of the gradient 13 of the flow rate gradient 12. However, it is also possible to ignore condition a), and to determine the time point of interrupting the flow of water into the capsule 1 when any one of the conditions b) and c) comes first.

After the best instant to stop the feeding of the first volume of water into the capsule 1 is determined, a predetermined waiting time is waited. The waiting time corresponds to the prewetting time, and its duration is, in certain non-limiting embodiments, 1 s to 3 s. The duration can, however, be changed by the user or can be selected based on the desired taste for the produced beverage. The prewetting time with the optimal first volume of water improves the extraction quality, and particularly the transfer of aroma compounds from the at least one beverage ingredient. Then, the feeding of water is restarted, i.e. a second volume of water is started to be fed into the capsule 1, in order to extract or dissolve the at least one beverage ingredient 2, to open the capsule 1, and to dispense the beverage.

Figure 4:
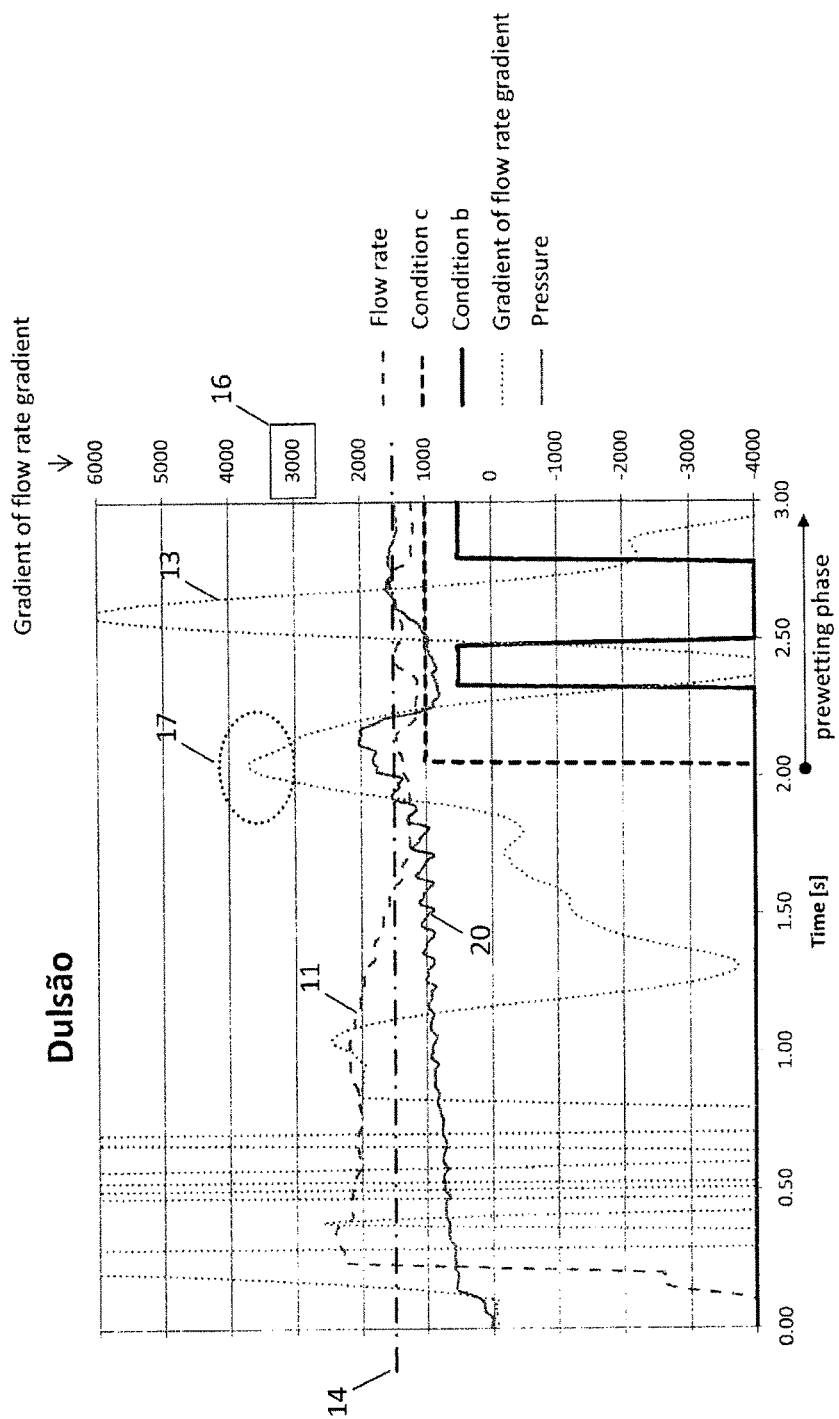
FIG. 4 shows parameters obtained from a measurement signal of a flow meter according to the presently disclosed and/or claimed inventive concept(s), and illustrates how prewetting is carried out accordingly.
Figure 5:
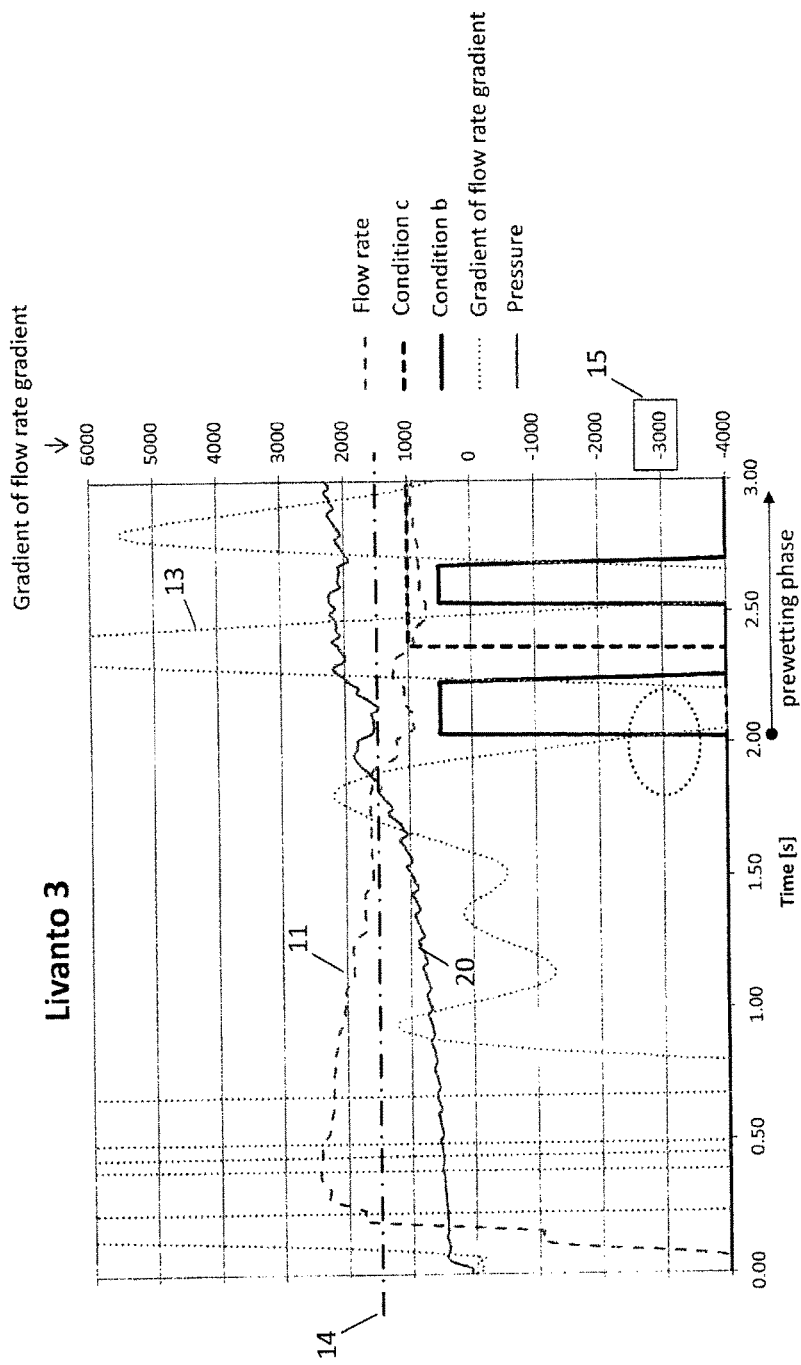
FIG. 5 shows parameters obtained from a measurement signal of a flow meter according to the presently disclosed and/or claimed inventive concept(s), and illustrates how prewetting is carried out accordingly.

FIGS. 4 and 5 show the above-mentioned parameters evaluated from the measurement signal 10 of the flow meter 3. In particular, the flow rate 11 (grey dashed line) and the gradient 13 (grey dotted line) of the flow rate gradient 12 are shown. Also a measurement signal 20 (grey solid line) from a pressure sensor 4 is shown, which may be used for verification of the other signals and the evaluation model. Furthermore, the FIGS. 4 and 5 show, at which instant the water flow into the capsule 1 is interrupted. In both FIGS. 4 and 5 the second condition b) (solid black line) and the third condition c) (black dashed line) as described above are illustrated and compared.

For the capsule used exemplarily in FIG. 4 (a Nespresso Dulsão capsule), the feeding of water into the capsule 1 is interrupted according to the precondition a) and the third condition c) indicating the occurrence of the second phenomenon, i.e. is interrupted when the flow rate 11 has reached (has dropped to or below) the first threshold value 14, and the gradient 13 of the flow rate gradient 12 has reached (has risen to or above) the third threshold value 16 and then exhibits a local maximum 17. In case of the capsule shown in FIG. 4, the detection of the second phenomenon is successful, and triggers the interruption of the water flow. The second condition b) indicating the occurrence of the first phenomenon is fulfilled after the third condition c). With interrupting the water flow, the prewetting time starts.

For the capsule used exemplarily in FIG. 5 (a Nespresso Livanto capsule), the precondition a) and the second condition b) indicating the occurrence of the first phenomenon is used, in order to determine when to interrupt the water flow into the capsule 1. In particular, the flow of water is interrupted when the flow rate 11 has reached (has dropped to or below) the first threshold value 14, and the gradient 13 of the flow rate gradient 12 reaches (drops to or below) the negative second threshold value 15. In case of the capsule shown in FIG. 5, the detection of the second phenomenon has failed before the occurrence of the first phenomenon, because the local maximum did not reach the third threshold value 16. The third condition c) indicating the occurrence of the second phenomenon may still be fulfilled after the second condition b) has been met.

The method of the presently disclosed and/or claimed inventive concept(s) is of particular advantage if different capsule types are to be used with the same beverage production device 8. With the method of the presently disclosed and/or claimed inventive concept(s), the best instant for interrupting the flow of water, and thus the ideal volume of water for prewetting, may be determined precisely for each capsule type.

In summary, the presently disclosed and/or claimed inventive concept(s) provides a method for determining precisely the volume of water to be used for prewetting at least one beverage ingredient 2 in a capsule 1, and particularly the best time point for interrupting the supply of the water into the capsule 1. Thereby the flow time and the yield of the produced beverage can be increased, and the taste of the produced beverage can significantly be improved. The method of the presently disclosed and/or claimed inventive concept(s) is very precise, and nevertheless provides a very simple implementation, which may be used by a beverage production device 8.

The invention claimed is:

1. A method for producing a beverage from a capsule containing at least one beverage ingredient, the method comprising:
feeding a first volume of water into the capsule for prewetting the at least one beverage ingredient;
interrupting the flow of water into the capsule for a predetermined waiting time;
feeding a second volume of water into the capsule for extracting the at least one beverage ingredient; and
dispensing the produced beverage; and
wherein a time point of interrupting the flow of water into the capsule is determined by evaluating a measurement signal output by a flow meter that measures the flow of water into the capsule, and wherein the time point is determined at least based on a gradient of a flow rate gradient evaluated from the measurement signal of the flow meter.

2. The method for producing a beverage according to claim 1, wherein an outlet face of the capsule is opened by feeding the second volume of water into the capsule.

3. The method for producing a beverage according to claim 1, wherein the second volume of water is fed into the capsule at a pressure of between 3 and 20 bar.

4. The method for producing a beverage according to claim 1, wherein the time point of interrupting the flow of water into the capsule is determined at least based on a flow rate evaluated from the measurement signal of the flow meter.

5. The method for producing a beverage according to claim 4, wherein the flow rate evaluated from the measurement signal of the flow meter is compared with a first threshold value, and the flow of water into the capsule is interrupted after the evaluated flow rate reaches the first threshold value.

6. The method for producing a beverage according to claim 1, wherein the gradient of the flow rate gradient is compared with a second threshold value, and the flow of water into the capsule is interrupted when the flow rate reaches the first threshold value and the gradient of the flow rate gradient reaches the second threshold value.

7. The method for producing a beverage according to claim 1, wherein the gradient of the flow rate gradient is analyzed for a local maximum and is compared with a third threshold value, and the flow of water into the capsule is interrupted when the flow rate reaches the first threshold value and the gradient of the flow rate gradient is at a local maximum and has reached the third threshold value.

8. The method for producing a beverage according to claim 6, wherein the second threshold value and the third threshold value, respectively, are selected such that the first volume of water fills about 85% to about 90% of the total volume of the capsule at the time point of interrupting the flow of water into the capsule.

9. The method for producing a beverage according to claim 1, wherein the flow rate is evaluated from the measurement signal of the flow rate meter after a predetermined delay time from the start of the feeding of the first volume of water.

10. The method for producing a beverage according to claim 1, wherein the predetermined waiting time is selectable by a user and/or is between about 1 second and about 3 seconds.

11. The method for producing a beverage according to claim 1, wherein the measurement signal of the flow meter is evaluated by a moving window averaging method calculated on a predetermined number of samples and with a predetermined filter time.

12. The method for producing a beverage according to claim 1, wherein the time point of interrupting the flow of water into the capsule determined by evaluating the measurement signal of the flow meter is verified based on a measurement signal of a pressure sensor.

13. A device for producing a beverage from a capsule containing at least one beverage ingredient, the device comprising:
a pump for feeding water from a water reservoir into the capsule;
a flow meter for measuring the flow of water into the capsule and for outputting a measurement signal to a control unit, wherein the measurement signal is evaluated by a moving window averaging method calculated on a predetermined number of samples and with a predetermined filter time, the control unit being configured to:
control the pump to feed a first volume of water into the capsule for prewetting the at least one beverage ingredient,
interrupt the flow of water into the capsule for a predetermined waiting time, and
control the pump to feed a second volume of water into the capsule for extracting the at least one beverage ingredient,
dispensing means for dispensing the produced beverage from the capsule, and wherein the control unit is configured to determine the time point of interrupting the flow of water into the capsule by evaluating a measurement signal of the flow meter.

14. A device for producing a beverage from a capsule containing at least one beverage ingredient, wherein the device is configured to carry out the method according to one of the claims 1-5 and 6-13.

15. The device of claim 14, further comprising opening means for opening an outlet face of the capsule.

16. A method for producing a beverage from a capsule containing at least one beverage ingredient, the method comprising:
   feeding a first volume of water into the capsule for prewetting the at least one beverage ingredient;
   interrupting the flow of water into the capsule for a predetermined waiting time;
   feeding a second volume of water into the capsule for extracting the at least one beverage ingredient; and
   dispensing the produced beverage; and
   wherein a time point of interrupting the flow of water into the capsule is determined by evaluating a measurement signal output by a flow meter that measures the flow of water into the capsule, and wherein the measurement signal of the flow meter is evaluated by a moving window averaging method calculated on a predetermined number of samples and with a predetermined filter time.

\* \* \* \* \*

UNITED STATES PATENT AND TRADEMARK OFFICE
CERTIFICATE OF CORRECTION

PATENT NO. : 10,244,884 B2
APPLICATION NO. : 15/110568
DATED : April 2, 2019
INVENTOR(S) : Minh Quan Phan and Alfred Yoakim It is certified that error appears in the above-identified patent and that said Letters Patent is hereby corrected as shown below:

Page 1 of 1

On the Title Page
Under (73) Assignee: Delete "Sestec" and replace with -- Nestec --

In the Specification
Column 9, Line 56: After "opening face" delete "la" and replace with -- 1a --

In the Claims
Column 13, Line 8: After "one of the claims" delete "1-5 and 6-13." and replace with -- 1-12. --

Signed and Sealed this
Twenty-first Day of May, 2019

Andrei Iancu
*Director of the United States Patent and Trademark Office*